(12) United States Patent
Nishiyama

(10) Patent No.: US 8,224,970 B2
(45) Date of Patent: Jul. 17, 2012

(54) WEB-SCREEN SHARING SYSTEM, WEB-SCREEN SHARING TERMINALS, AND SHARING PROGRAM THEREOF

(75) Inventor: Kazuo Nishiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 12/250,142

(22) Filed: Oct. 13, 2008

(65) Prior Publication Data

US 2009/0119602 A1 May 7, 2009

(30) Foreign Application Priority Data

Nov. 7, 2007 (JP) ................................. 2007-289104

(51) Int. Cl.
G06F 15/16 (2006.01)
(52) U.S. Cl. .......................... 709/227; 709/229; 709/204
(58) Field of Classification Search .................. 709/204, 709/227, 229
See application file for complete search history.

(56) References Cited

U.S. PATENT DOCUMENTS

| 7,933,955 B2* | 4/2011 | Khalatian | 709/205 |
| 2006/0208871 A1* | 9/2006 | Hansen | 340/506 |
| 2008/0162635 A1* | 7/2008 | Keren | 709/204 |
| 2008/0307504 A1* | 12/2008 | Cisler et al. | 726/4 |

* cited by examiner

*Primary Examiner* — Larry Donaghue
(74) *Attorney, Agent, or Firm* — Oblon, Spivak, McClelland, Maier & Neustadt, L.L.P.

(57) ABSTRACT

A Web-screen sharing system including a first and a second terminals, and a mediation server. The system includes: the terminals exchanging addresses through the mediation server; connecting the terminals using the addresses; when the first terminal is connected to any Web server, detecting whether a content in the Web server is security-protected; if protected, performing predetermined authentication processing with the Web server; when the authentication is successful, the Web server transmitting a content following the authentication processing to the first terminal; the first terminal displaying the content as a Web screen, and capturing the Web screen; transmitting an image file of the Web screen to the second terminal to display the screen on the second terminal, if not protected, the first terminal receiving the content from the Web server, and transmitting a URL at that time to the second terminal to display the Web screen.

8 Claims, 3 Drawing Sheets

WEB-SCREEN SHARING SYSTEM, WEB-SCREEN SHARING TERMINALS, AND SHARING PROGRAM THEREOF

CROSS REFERENCES TO RELATED APPLICATIONS

The present invention contains subject matter related to Japanese Patent Application JP 2007-289104 filed in the Japanese Patent Office on Nov. 7, 2007, the entire contents of which are incorporated herein by reference.

BACKGROUND OF THE INVENTION

1. Field of the Invention

This invention relates to a Web-screen sharing system in consideration of a security function, Web-screen sharing terminals, and the sharing program thereof.

2. Description of the Related Art

Techniques of sharing a Web screen have been realized. There are the following two methods to implement the techniques, for example. In a first method of sharing a Web screen, an overall system is configured as shown in FIG. 3, for example. Here, a terminal A is a master terminal, for example, configured by a personal computer. A terminal B is a slave terminal, for example, configured by a personal computer. Reference numeral S denotes any Web server providing Web pages (so-called home pages).

In this case, for example, the terminal A is located in Tokyo, the terminal B is located in Hokkaido, and the terminals A and B, and the Web server S are mutually connected through the Internet (not shown in the figure). Also, the terminals A and B, and the Web server S access information, for example, by TCP/IP.

When a browser is started at the terminal A, and the URL of the Web server S is entered, the terminal A is connected to the Web server S through the Internet as shown by step 31. Then, an HTML file provided in the Web server S is transmitted from he Web server S to the terminal A through the Internet as shown by step 32, and is received by the terminal A. Accordingly, a Web screen in accordance with the HTML file transmitted from the Web server S is displayed on the terminal A.

Also, at this time, as shown by step S33, the URL transmitted from the terminal A to the Web server S in step 31 is transmitted from the terminal A to the terminal B. Then, as shown by step 34, the terminal B is connected to the Web server S through the Internet in the same manner as the terminal A. As shown by step 35, the HTML file transmitted from the Web server S to the terminal A in step 32 is transmitted from the Web server S to the terminal B through the Internet, and the HTML file is received by the terminal B.

Accordingly, the Web screen in accordance with the HTML file transmitted from the Web server S is displayed on the terminal B. That is to say, when various operations are performed by the terminal A on the Web server S, the operation result is displayed onto the terminal A, the operation contents performed at the terminal A is sent to the terminal B, and that operation content is reproduced at the terminal B. Thus, the Web screen displayed on the terminal A is also displayed on the terminal B. Accordingly, the terminal A and the terminal B can share the Web screen.

Also, as a second method of sharing a Web screen, polling is provided. This is a method in which a Web screen displayed on the terminal A is output to an image file at regular intervals, the image file is transmitted to the terminal B at regular intervals, and the Web screen displayed on the terminal A is also displayed onto the terminal B.

In this regard, related-art technical documents include, for example, Japanese Unexamined Patent Application Publication No. 2006-146629.

SUMMARY OF THE INVENTION

However, in the above-described first method of sharing a Web screen, if there is a difference in setting of cookies of the browsers or cookie information between the terminal A and the terminal B, a difference arises in a Web screen displayed on the terminal A and a Web screen displayed on the terminal B. Also, if the browser used in the terminal A and the browser used in the terminal B are different, a difference often arises in the design of a Web screen to be displayed.

Moreover, the operation contents conducted on the Web server S from the terminal A in step 31 is also transmitted from the terminal A to the terminal B in step 33. Accordingly, for example, if the Web server S is a server for carrying out reservation or sales of tickets or goods, and thus identification information, such as a password, etc., is necessary to be entered on a displayed page (Web screen), the entered identification information is also transmitted from the terminal A to the terminal B in step 33. As a result, there is a problem in security.

In the case of the second method of sharing a Web screen, the identification information transmitted from the terminal A to the Web server S is not transmitted to the terminal B, and only a Web screen of the final result is transmitted from the terminal A to the terminal B. Thus, the method is safe in view of security.

However, in the second method of sharing a Web screen, the image data of a Web screen of the terminal A is transmitted to the terminal B on each polling cycle. Accordingly, the amount of communication becomes large, and thus it is not desirable for the Internet. For example, if the line capacity between the terminal A and the terminal B is small, the communication increases the circuit load, and the display on the terminal B is delayed.

The present invention addresses the above-described problems.

According to an embodiment of the present invention, there is provided a Web-screen sharing system including a first terminal, a second terminal and a mediation server, the system including: the first terminal and the second terminal sending individual addresses to each other through the mediation server; connecting the first terminal and the second terminal with each other in accordance with the sent addresses; when the first terminal is connected to any Web server, detecting whether a content in the Web server is security-protected; if the content is security-protected as a result of the detecting, performing predetermined authentication processing between the Web server and the first terminal; when the authentication processing is successful, the Web server transmitting a content following the authentication processing to the first terminal; the first terminal displaying the transmitted content as a Web screen, and capturing the displayed Web screen; transmitting an image file of the captured Web screen to the second terminal to display the captured Web screen on the second terminal, if the content is not security-protected as a result of the detecting, the first terminal receiving the content from the Web server to display as a Web screen, and transmitting a URL at that time to the second terminal to display the Web screen displayed on the first terminal.

By this invention, it is possible to share a Web screen selected by a transmission terminal with a receiving terminal. In that case, if it is necessary for a Web server to protect security, the identification information of the user will not be externally exposed. Also, if it is not necessary for the Web server to protect security, the transmission terminal and the receiving terminal can share a Web screen substantially at the same time.

Also, for example, if a user at the receiving terminal lacks knowledge of ticket reservation, etc., another user at the transmission terminal can carry out necessary operations instead while allowing the user at the receiving terminal to view the procedure. Thus, it is possible to for the user at the receiving terminal to perform ticket reservation, etc., without worry.

DESCRIPTION OF THE PREFERRED EMBODIMENTS

1. Example of Configuration and Operation of Overall System

Figure 1:
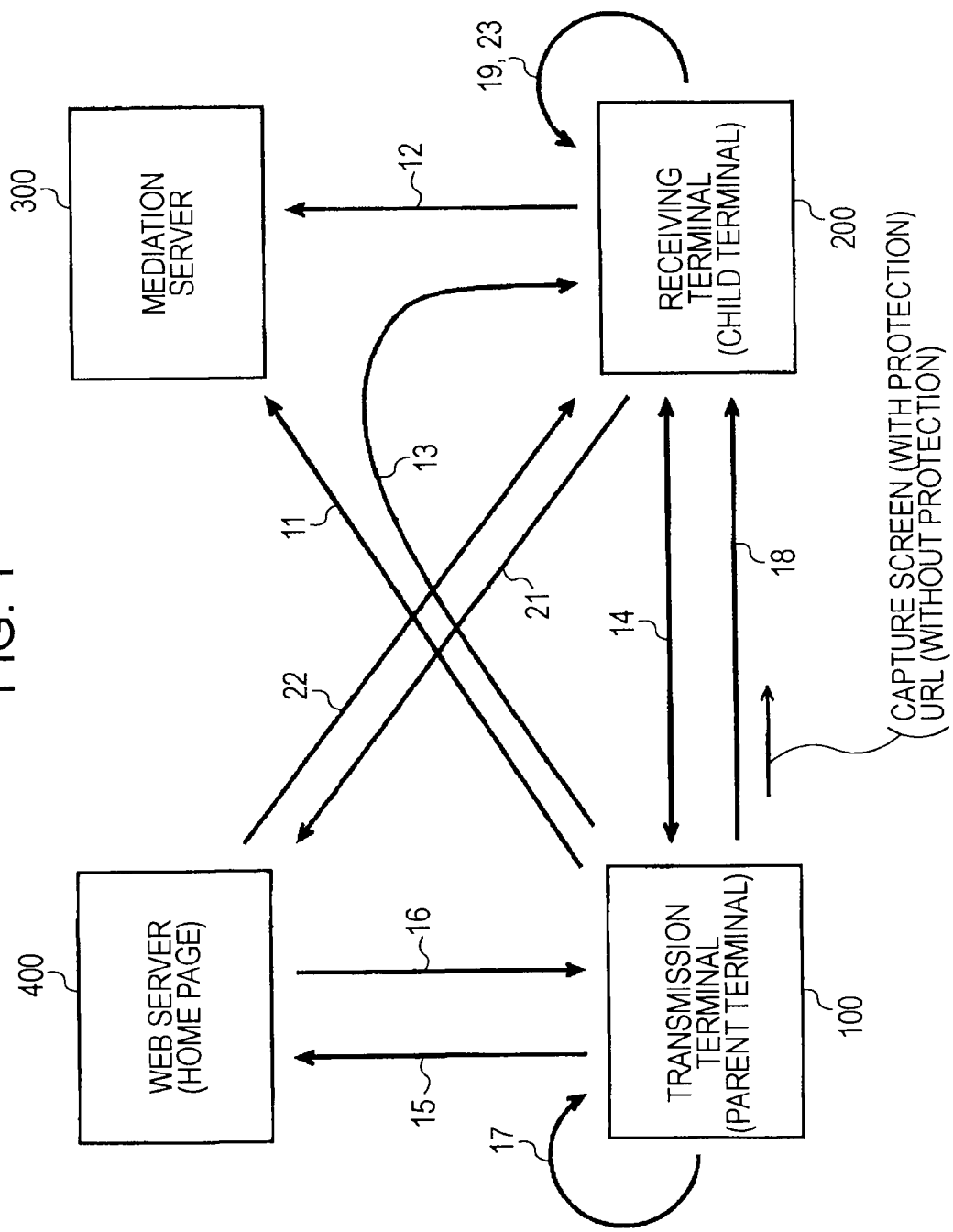
FIG. 1 is a system diagram illustrating an embodiment of this invention.
Figure 3:
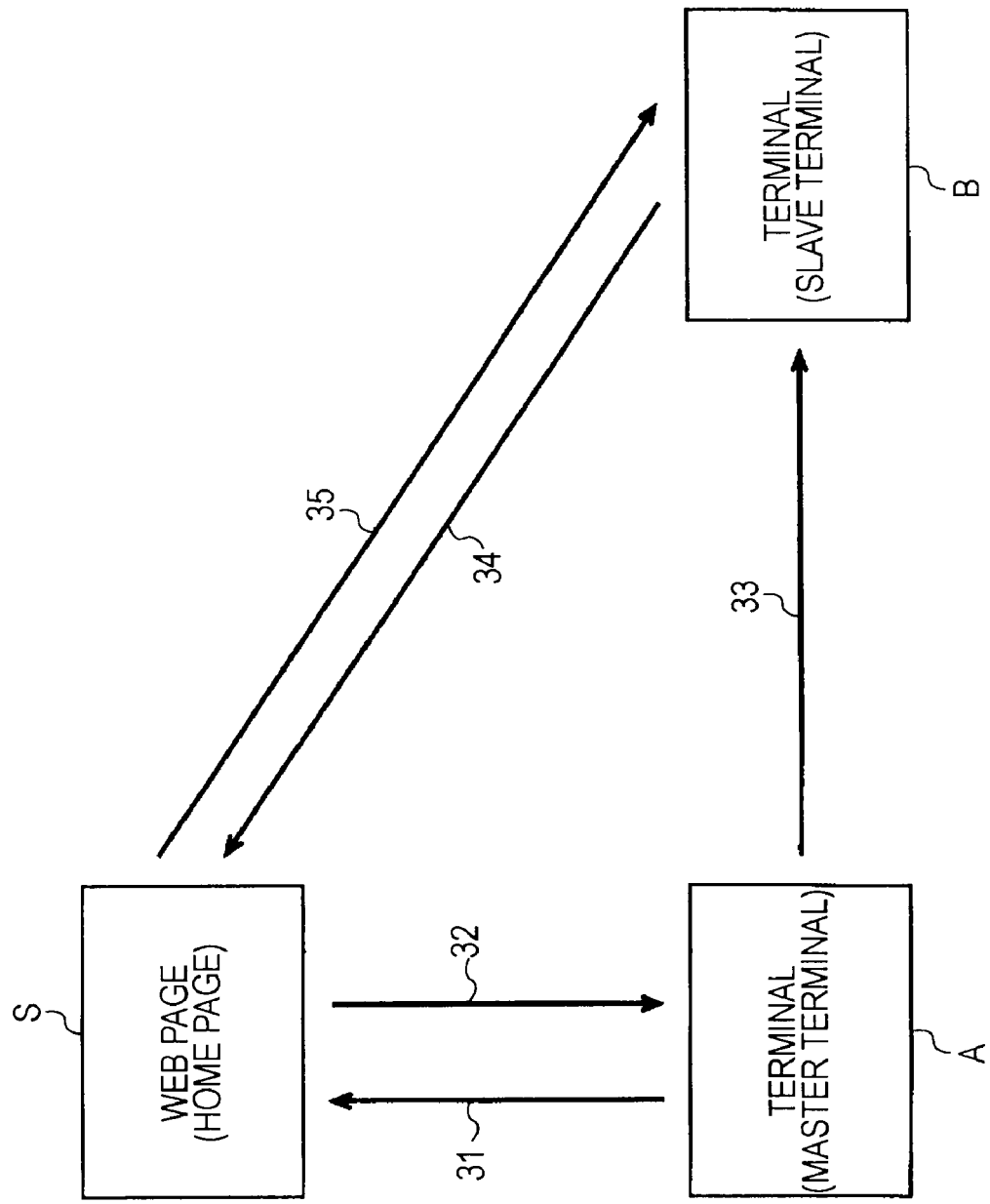
FIG. 3 is a system diagram illustrating this invention.

In FIG. 1, reference numeral 100 denotes a transmission terminal, and reference numeral 200 denotes a receiving terminal. These terminals correspond to the terminal A and the terminal B in FIG. 3, respectively, and include a personal computer individually, for example. Also, reference numeral 300 denotes a mediation server, and reference numeral 400 denotes any Web server providing a Web page (a so-called home page).

In this case, the transmission terminal 100, the receiving terminal 200, the mediation server 300, and the Web server 400 are mutually connected through the Internet (not shown in the figure), for example, and the terminal 100 to the Web server 400 perform information access by TCP/IP, for example.

The mediation server 300 mediates a P2P (Peer to Peer) connection between the transmission terminal 100 and the receiving terminal 200. Thus, the mediation server 300 may be an SIP (Session Initiation Protocol) server, an XMPP (eXtensible Messaging and Presence Protocol) server, or the like. Also, the Web server 400 is any server providing a so-called home page (Web page), and the home page is built by an HTML file, for example.

However, there are two ways of using the Web server 400. One is the case in which the Web server 400 only provides a general home page, and thus security protection is not necessary. The other is the case in which the Web server 400 carries out reservation or sales of tickets or goods, and thus security protection is necessary. In the case of a server in which security protection is necessary, the user is requested to enter information for identifying the user, for example, a user name, a password, etc., on the displayed page (Web screen). If the user-identification information is correct, the processing proceeds to the next step.

In the transmission terminal 100 to the Web server 400, the processing of steps 11 to 19, and 21 to 23, shown in FIG. 1 and described below, are performed. In this regard, in the following description, the steps 11 to 19, and 21 to 23 correspond to reference numerals 11 to 19, and 21 to 23 in FIG. 1.

Also, the processing performed among the transmission terminal 100 to the Web server 400 is executed through the Internet. Further, in the following, an HTML file includes files that are described in this file and are to be expressed by a browser and a plug-in thereof, for example, an image file, etc.

1.1 When the Web Server 400 Requests Security Protection

In this case, the processing of steps 11 to 19 is performed in this sequence. That is to say,

Step 11

The transmission terminal 100 establishes a connection to the mediation server 300 by performing a predetermined program on the transmission terminal 100, and registers information necessary for the P2P connection of the transmission terminal 100 to the receiving terminal 200, that is to say, the IP address of the transmission terminal 100 to the mediation server 300.

Step 12

The receiving terminal 200 establishes a connection to the mediation server 300 by performing a predetermined program on the receiving terminal 200, and registers information necessary for the P2P connection of the receiving terminal 200 to the transmission terminal 100, that is to say, the IP address of the receiving terminal 200 to the mediation server 300. In this regard, the sequence of steps 11 and 12 may be the opposite.

Step 13

The transmission terminal 100 request to start a P2P connection to the receiving terminal 200 through the mediation server 300. In this regard, the receiving terminal 200 may request to start this connection.

Step 14

The transmission terminal 100 establishes a P2P connection with the receiving terminal 200.

Step 15

In the transmission terminal 100, a browser is started, and the URL of the Web server 400 is entered to connect to the Web server 400. At the same time, in this case, a request is made of the Web server 400 for transmitting a content to be shared, that is to say, an HTML file to be displayed as a Web screen.

In this regard, at this point in time, the transmission terminal 100 can know whether the Web server 400 is security-protected. That is to say, for example, if the Web server 400 is not security-protected, the URL of the Web server 400 starts with "http://". However, if it is security-protected, SSL (Secure Sockets Layer) is implemented, and the URL starts with "https://". Thus, it is possible to know whether the Web server 400 is security-protected. In this case, the Web server 400 is security-protected.

Step 16

The Web server 400 transmits the content requested in step 15 to the transmission terminal 100 in step 16.

Step 17

While the transmission terminal 100 receives the content transmitted in step 16, the transmission terminal 100 repeats the check of the state of the transmitted content and a UI operation. Depending on the result of the check, the transmission terminal 100 sets a flag to "successful". Here, the flag is set to "successful" when the following state 1 or 2 is detected. That is to say, 1. When the Transmission Terminal 100 is Connected to a Web Server 400 which is Security-Protected The flag is set to "successful" when the user-authentication processing is performed using the user information such as a password, the authentication is successful, and then a Web screen is updated to the subsequent Web screen.

2. When the Transmission Terminal 100 is Connected to a Web Server 400 which is not Security-Protected 2A. When the Web server 400 completes the transmission of a content, and transmission terminal 100 has completed the display of the content. In this regard, the completion of the display of the content by the transmission terminal 100 can be determined whether a DOM (Document Object Model) tree has been completed. Alternatively, 2B. When the scroll is completed by the UI of the transmission terminal 100. This is the case when a scroll event is not generated for a predetermined period of time from the start of a scroll event. For example, when a scroll operation is not performed for a predetermined period, such as a final part of content has been displayed, or the scroll is paused because an important figure appears during the scroll.

In the case 2A or 2B, the flag is set to "successful".

This is the case where the transmission terminal 100 is connected to a Web server 400 which is security-protected, and thus an HTML file for performing authentication is transmitted in step 16, this file is displayed as an authentication screen in step 17, and the input of the identification information, such as a password is requested. The input identification information is transmitted to the Web server 400 in step 15, and the Web server 400 checks the identification information.

When the authentication is successful, the flag is set to "successful". Also, the flag and an image file of the Web screen succeeding to the successful authentication is transmitted from the Web server 400 to the transmission terminal 100 in step 16.

Step 18

When the transmission terminal 100 detects that the flag is "successful", the transmission terminal 100 captures the screen displayed on the transmission terminal 100, and transmits the image file of the captured result to the receiving terminal 200. In this case, the transmission image file can be subjected to data compression using the JPEG, GIF, or PNG format, etc. Thus, the file can be transmitted and received in a short time. Even if the line capacity between the transmission terminal 100 and the receiving terminal 200 is small, the transmission and the receiving become easy.

Step 19

The receiving terminal 200 receives the image file transmitted in step 18, and receives the image file as an image.

After that, the processing of steps 15 to 19 is repeated. However, the authentication in steps 15 and 16 is omitted.

By the above, it is possible to display the Web screen displayed on the transmission terminal 100 onto the receiving terminal 200. That is to say, the Web screen selected by the transmission terminal 100 can be shared with the receiving terminal 200.

In that case, the Web screen transmitted from the transmission terminal 100 to the receiving terminal 200 is transmitted in the state of the above-described 1. Thus, the user-identification information is not exposed externally.

1.2 When the Web Server 400 Does Not Request Security Protection

In this case, in the same manner as the case of 1.1, by performing steps 11 to 15, it is possible for the transmission terminal 100 to know that the Web server 400 does not request security protection. Thus, the processing of step 16 and after is performed as follows.

Step 16

In the same manner as the case of 1.1, the Web server 400 transmits the content requested in step 15, that is to say, an HTML file to be displayed as a Web screen to the transmission terminal 100 in step 16.

Step 17

In the same manner as the case of 1.1, while the transmission terminal 100 receives the content transmitted in step 16, the transmission terminal 100 repeats the check of the state of the transmitted content and the UI operation. Depending on the result of the check, the transmission terminal 100 sets a flag to "successful". Here, the flag is set to "successful" when the state of 2 is detected.

Step 18

If the transmission terminal 100 detects that the flag is "successful", the transmission terminal 100 transmits the URL of the screen displayed on the transmission terminal 100 to the receiving terminal 200.

Step 21

In the receiving terminal 200, a browser is started, and the URL transmitted in step 18 is input to connect to the Web server 400. At the same time, a request is made of the Web server 400 for transmitting a content to be displayed, that is to say, in this case, an HTML file to be displayed as a Web screen.

Step 22

The Web server 400 transmits the content requested in step 21, that is to say, the HTML file to be displayed as a Web screen to the receiving terminal 200 in step 22.

Step 23

The receiving terminal 200 receives the content transmitted in step 22. Next, after that, each time the processing of steps 15 and 16 is performed, the processing of steps 18 to 23 is repeated.

By the above, it is possible to display the Web screen displayed on the transmission terminal 100 onto the receiving terminal 200. That is to say, the Web screen selected by the transmission terminal 100 can be shared with the receiving terminal 200.

For the Web server 400 that does not necessitate security protection, the URL thereof is only transmitted from the transmission terminal 100 to the receiving terminal 200, and thus it is possible to share a Web screen between the transmission terminal 100 and the receiving terminal 200 substantially at the same time.

Summary

By the above, it is possible to share a Web screen selected by the transmission terminal 100 with the receiving terminal 200.

In that case, when the Web server 400 necessitates security protection, the transmission terminal 100 transmits the Web screen to the receiving terminal 200, and the Web screen transmitted is transmitted in the state of the above-described 1. Thus, the user-identification information is not exposed externally.

Also, when the Web server 400 does not necessitate security protection, the URL of the Web server 400 is only transmitted from the transmission terminal 100 to the receiving terminal 200, and thus it is possible to share a Web screen between the transmission terminal 100 and the receiving terminal 200 substantially at the same time.

Also, for example, if a user of the receiving terminal 200 wants to reserve or purchase tickets or goods, but lacks that kind of knowledge, another user of the transmission terminal 100 carries out necessary operations instead while allowing the user of the receiving terminal 200 to view the procedure. Accordingly, it is possible for the user of the receiving terminal 200 to reserve and purchase the ticket or the goods without worry.

2. Example of Transmission Terminal 100

Figure 2:
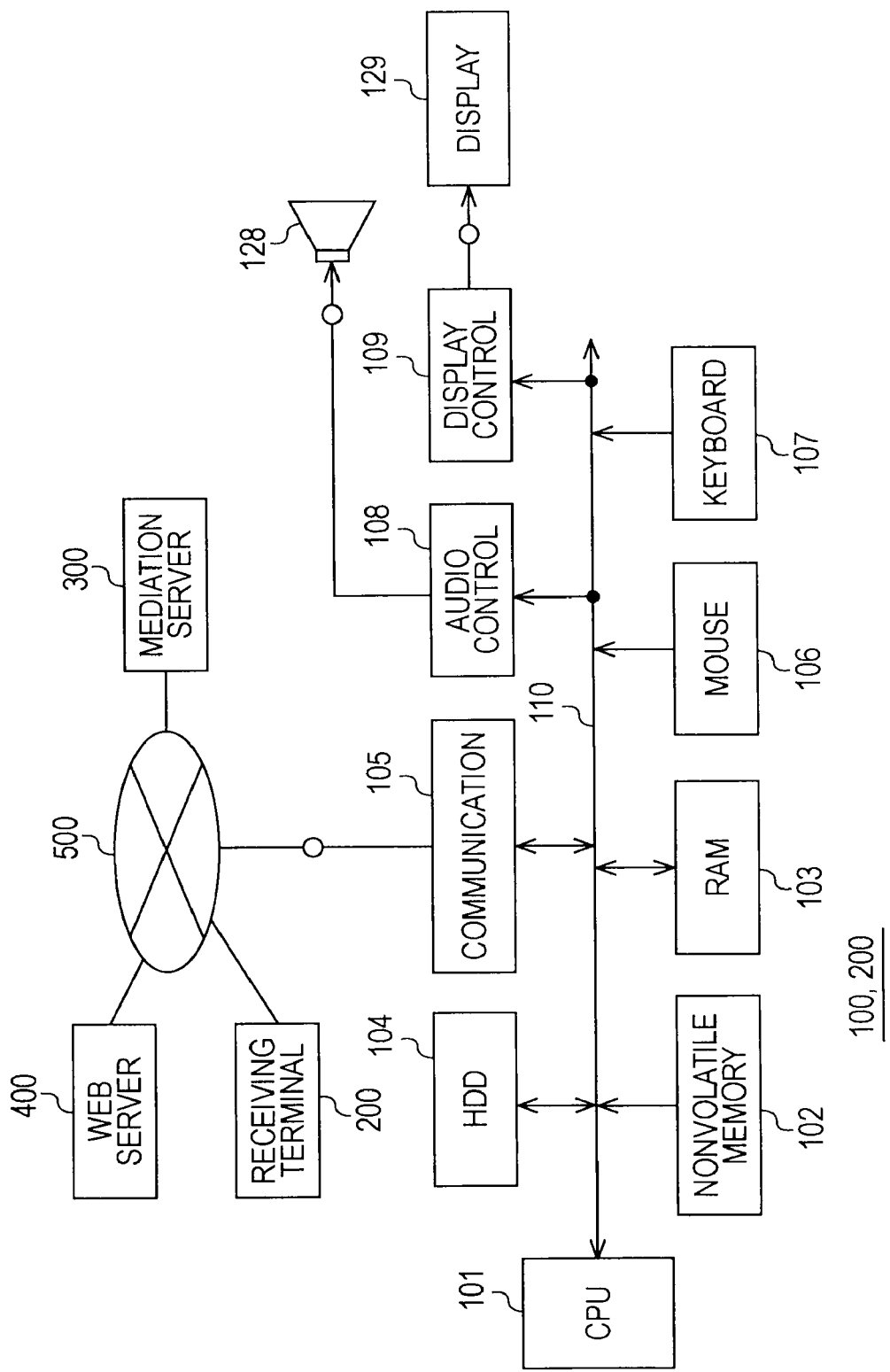
FIG. 2 is a schematic diagram illustrating an embodiment of this invention.

FIG. 2 illustrates an example of a configuration of the transmission terminal 100, which is configured by a personal computer. That is to say, the transmission terminal 100 has a CPU 101 which performs various programs, a nonvolatile memory 102 which saves an IPL, a RAM 103 for a working area, and these are mutually connected through a system bus 110.

Furthermore, the transmission terminal 100 has a hard disk drive 104 as a large-volume file storage means, which is also connected to the system bus 110. The hard disk drive 104 is a storage device for saving or storing files of various data and programs, and saves the OS and various programs. As part of the application programs, routines for performing the processing of the above-described steps 11 to 19 and 21 to 23 are included.

Also, a communication circuit 105 is connected to a system bus 110, and the communication circuit 105 is connected to the Internet 500. The transmission terminal 100 is allowed to communicate with the receiving terminal 200 to the Web server 400 through the communication circuit 105. Further, a mouse 106, a keyboard 107, an audio control circuit 108, and a display control circuit 109 are connected to the system bus 110 as an input UI and an output UI. Also, a speaker 128 and a display 129 are connected to the audio control circuit 108, and the display control circuit 109, respectively. In this regard, the receiving terminal 200 can be configured in the same manner as the transmission terminal 100, but is not necessary to have so much performance as the transmission terminal 100.

When the power is turned on, the OS is loaded from the hard disk drive 104 to the RAM 103 by the IPL in the non-volatile memory 102, and then the programs executing steps 11 to 19, and 21 to 23 are loaded into the RAM 103, and is executed as described above.

In this regard, in the case of an HTML file displaying a content and a Web screen, which have been transmitted through the Internet 500, the HTML file is interpreted by a browser to be an image data. The image data is supplied to the display 129 through the display control circuit 109. Accordingly, the display control circuit 109 displays the Web screen.

In this manner, in the transmission terminal 100 to the Web server 400, steps 11 to 19 or steps 21 to 23 are executed, a Web screen downloaded into the transmission terminal 100 is displayed onto the transmission terminal 100, and is also displayed onto the receiving terminal 200. That is to say, the sharing of a Web screen is achieved. In addition, it is possible to implement security protection at that time.

It should be understood by those skilled in the art that various modifications, combinations, sub-combinations and alterations may occur depending on design requirements and other factors insofar as they are within the scope of the appended claims or the equivalents thereof.

What is claimed is:

1. A Web-screen sharing system including a first terminal, a second terminal and a mediation server, the system comprising:
the first terminal and the second terminal sending individual addresses to each other through the mediation server;
connecting the first terminal and the second terminal with each other in accordance with the sent addresses;
when the first terminal is connected to any Web server, detecting whether a content in the Web server is security-protected;
if the content is security-protected as a result of the detecting, performing predetermined authentication processing between the Web server and the first terminal;
when the authentication processing is successful, the Web server transmitting a content succeeding the authentication processing to the first terminal;
the first terminal displaying the transmitted content as a Web screen, and capturing the displayed Web screen;
transmitting an image file of the captured Web screen to the second terminal to display the captured Web screen on the second terminal,
if the content is not security-protected as a result of the detecting, the first terminal receiving the content from the Web server to display as a Web screen, and transmitting a URL at that time to the second terminal to display the Web screen displayed on the first terminal.

2. The Web-screen sharing system according to claim 1, wherein the content is an HTML file to be displayed as a Web screen, and a file described in the HTML file and to be expressed by a browser or a plug-in thereof.

3. A Web-screen sharing terminal comprising:
a communication circuit performing communication with another terminal and any one of Web servers;
specification means for specifying one Web server out of the Web servers;
display means for displaying a content sent from the specified Web server as an image;
capture means for capturing the image displayed by the display means;
detection means for detecting whether security-protected when connected to the specified Web server; and
authentication means for performing authentication processing with the security-protected Web server;
wherein when connected to any one of Web servers through the communication circuit, the detection means detects whether a content in the Web server is security-protected,
if the content is security-protected as a result of the detection, the authentication means performs predetermined authentication processing with the Web server and the first terminal,
if the authentication processing is successful, the terminal receives a content succeeding the authentication processing from the Web server by the communication circuit,
the display means displays the received content as a Web screen, and the capture means captures the displayed Web screen,
the terminal transmits an image file of the captured Web screen to the second terminal through the communication circuit to display the captured Web page to the second terminal,
if the content is not security-protected as a result of the detection, the terminal receives a content by the communication circuit from the Web server to display the content as a Web screen by the display means, and transmits a URL at this time to the second terminal through the communication circuit to display the Web screen displayed on the first terminal onto the second terminal.

4. The Web-screen sharing terminal according to claim 3, wherein the communication circuit exchanges individual addresses with another terminal through a mediation server,
the communication circuit establishes a connection with the other terminal in accordance with the addresses exchanged, and
after the connection is established, the terminal transmits an image file of the captured image or the URL.

5. The Web-screen sharing terminal according to claim 3 or claim 4,
wherein the content is an HTML file to be displayed as a Web screen, and a file described in the HTML file and to be expressed by a browser or a plug-in thereof.

6. A Web-screen sharing program executed by a CPU in a first terminal for displaying a Web screen displayed on the first terminal onto a second terminal, the program comprising the steps of:
  connecting to a Web server specified by a user,
  detecting whether a content in the Web server is security-protected after a connection is established by the step of connecting,
  if the content is security-protected as a result of the detecting, performing predetermined authentication processing between the Web server and the first terminal;
  if the authentication processing is successful, when the Web server transmits a content succeeding the authentication processing to the first terminal, first displaying the transmitted content as a Web screen;
  capturing the displayed Web screen;
  first transmitting an image file of the captured Web screen to the second terminal to display the captured Web screen on the second terminal;
  if the content is not security-protected as a result of the detecting, receiving the content from the Web server and second displaying the content as a Web screen; and
  second transmitting a URL at this time to the second terminal display the Web screen displayed on the first terminal to the second terminal.

7. The Web-screen sharing program according to claim 6, further comprising the steps of:
  a first step of exchanging addresses with the second terminal through a mediation server; and
  a second step of connecting the first terminal to the second terminal in accordance with the addresses exchanged by the first step,
  wherein the step of connecting and the succeeding steps are executed in sequence following the second step.

8. A Web-screen sharing terminal comprising:
  a communication circuit performing communication with another terminal and any one of Web servers;
  a specification mechanism specifying one Web server out of the Web servers;
  a display mechanism displaying a content sent from the specified Web server as an image;
  a capture mechanism capturing the image displayed by the display mechanism;
  a detection mechanism detecting whether security-protected when connected to the specified Web server; and
  an authentication mechanism performing authentication processing with the security-protected Web server;
  wherein when connected to any one of Web servers through the communication circuit, the detection mechanism detects whether a content in the Web server is security-protected,
  if the content is security-protected as a result of the detection, the authentication mechanism performs predetermined authentication processing between the Web server and the first terminal,
  if the authentication processing is successful, the terminal receives a content succeeding the authentication processing from the Web server by the communication circuit,
  the display mechanism displays the received content as a Web screen, and the capture mechanism captures the displayed Web screen,
  the terminal transmits an image file of the captured Web screen to the second terminal through the communication circuit to display the captured Web page to the second terminal,
  if the content is not security-protected as a result of the detection, the terminal receives a content by the communication circuit from the Web server to display the content as a Web screen by the display mechanism, and transmits a URL at this time to the second terminal through the communication circuit to display the Web screen displayed on the first terminal onto the second terminal.

* * * * *